Sept. 9, 1958  W. KIERSTED, JR., ET AL  2,851,395
SOLVENT REFINING PROCESS WITH CONTROL OF TEMPERATURE
Filed Dec. 23, 1955
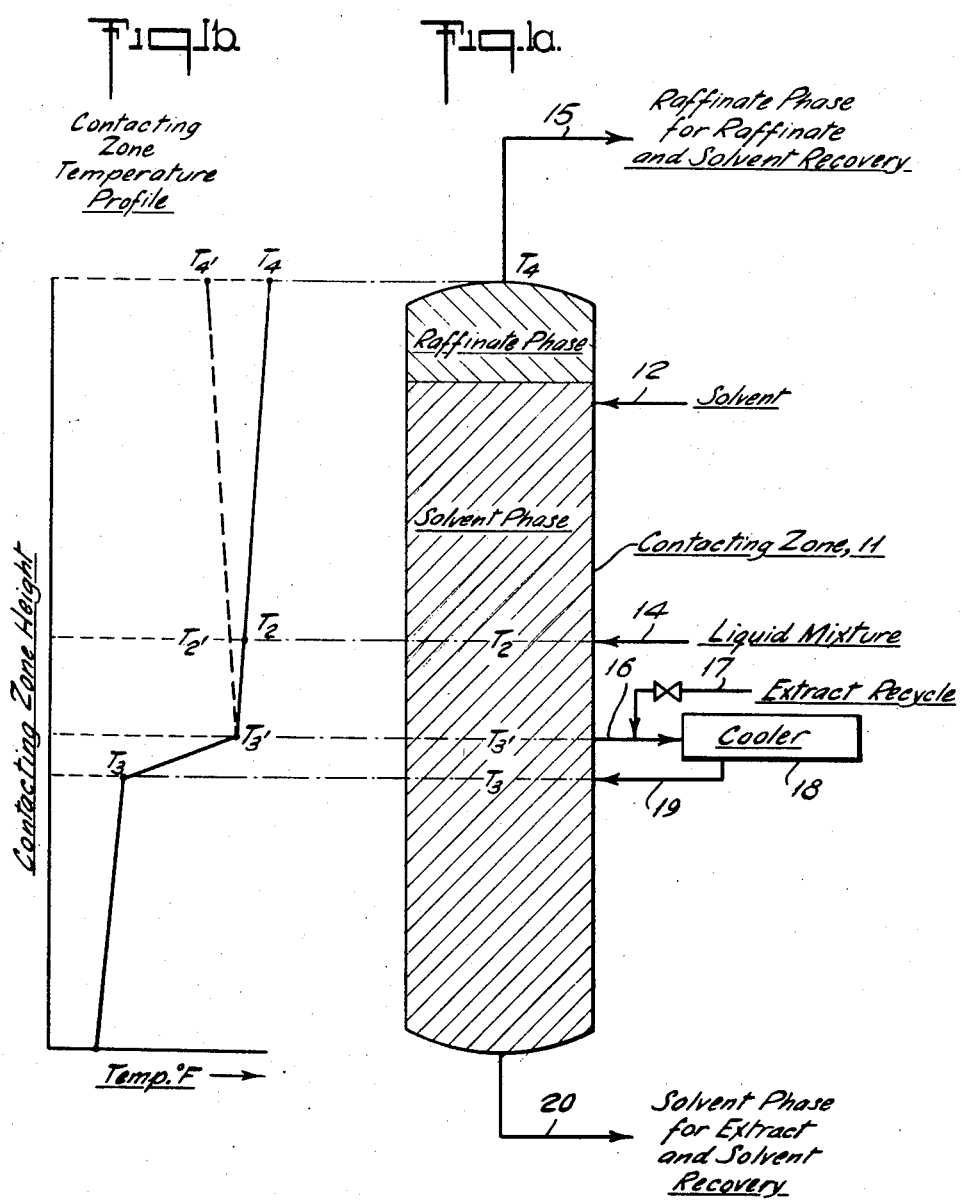

United States Patent Office 2,851,395
Patented Sept. 9, 1958

2,851,395

SOLVENT REFINING PROCESS WITH CONTROL OF TEMPERATURE

Wynkoop Kiersted, Jr., Scarsdale, and Howard H. Gross, Pleasantville, N. Y., assignors to Texaco Development Corporation, New York, N. Y., a corporation of Delaware Application December 23, 1955, Serial No. 554,965

19 Claims. (Cl. 196—14.26)

This invention relates to the fractionation of liquid mixtures wherein a liquid mixture is separated into its components by solvent extraction. More particularly, this invention relates to the fractionation of mixtures by solvent extraction wherein two separate liquid phases are flowed countercurrently with respect to each other within a contacting or extraction zone.

It is an object of this invention to provide an improved liquid-liquid countercurrent solvent extraction process.

Another object of this invention is to provide a flexible liquid-liquid countercurrent solvent extraction process adaptable for solvent refining or treating a wide variety of liquid mixtures.

Still another object of this invention is to provide a solvent extraction process suitable for the fractionation of hydrocarbon mixtures, such as petroleum fractions in the gasoline, kerosene, gas-oil or lubricating oil boiling range wherein furfural is employed as the selective solvent.

In at least one embodiment of this invention at least one of the foregoing objects will be achieved. How these and other objects of this invention are achieved will become apparent with reference to the accompanying disclosure and drawing wherein Fig. 1a is a schematic illustration of one embodiment of the practice of this invention and wherein Fig. 1b graphically illustrates the temperature conditions existing within the contacting zone or tower schematically illustrated in Fig. 1a.

As basis for our invention we have observed that the effectiveness of a liquid-liquid countercurrent solvent refining operation, as evidenced by the difference between the quality of the extract in solution in the selective solvent phase, is greater when substantially all of the liquid mixture to be fractionated is introduced into the liquid-liquid countercurrent solvent refining or contacting zone under conditions such that substantially all of the liquid mixture is first taken into the selective solvent phase at a relatively high temperature and then a portion of this mixture is released from the solution in the selective solvent phase by cooling. We have observed that the above operation gives improved results with respect to quantity and/or quality in a desired raffinate phase as compared with a liquid-liquid countercurrent solvent refining operation wherein the same equilibrium temperature is reached by mixing substantially the same volume and mixture of selective solvent at a lower temperature and then heating the resulting admixture to the same equilibrium temperature.

As a further basis for our invention, we have observed that in a liquid-liquid countercurrent solvent refining operation it is advantageous to provide a liquid-liquid countercurrent contacting or solvent extraction zone wherein a relatively large proportion of said zone is operated or can be adjusted to operate at a relatively low temperature under which condition the selective solvent, e. g., furfural, would be more selective.

In accordance with our invention in a liquid-liquid countercurrent solvent extraction or refining operation wherein a liquid selective solvent is injected at one end into a liquid-liquid countercurrent contacting or refining zone and a liquid mixture to be fractionated is introduced at an intermediate point into said contacting or refining zone, and wherein a raffinate phase or portion of said liquid mixture is withdrawn from said one end of said contacting zone and a selective solvent phase is withdrawn from the other end of said contacting zone, improved results are obtained by maintaining that portion or interval of the contacting zone between the point of introduction of said liquid mixture and the point of withdrawal of said raffinate phase under substantially isothermal conditions, such as a temperature differential in the range 0 to ±12 between said one end of said contacting zone and that level within said contacting zone at the point of introduction of said liquid mixture, said temperature differential being in degrees Fahrenheit. Additionally, and still in accordance with the practice of this invention, a liquid stream is withdrawn from the contacting zone at a point downstream from the point of introduction of said liquid mixture in the direction of flow of the liquid selective solvent therein and this liquid stream, after cooling, is reintroduced into said contacting zone at a point near the point of withdrawal of said liquid stream from said contacting zone but downstream therefrom in the direction of flow of said liquid selective solvent. Desirably a portion of the extract contained dissolved in the liquid selective solvent phase removed from said other end of said contacting zone is recovered and after commingling and cooling together with said withdrawn liquid stream, is reintroduced therewith into said contacting zone.

The withdrawn liquid stream, later reintroduced in whole, is any liquid phase within the contacting zone at the point of withdrawal, e. g., selective solvent phase, raffinate phase, either continuous or dispersed, alone or admixed with raffinate or solvent, respectively.

Further explanatory of our invention and referring now to Fig. 1a of the drawing which schematically illustrates one embodiment of the practice of this invention wherein the selective solvent phase comprises the continuous phase within the contacting zone extending from one end at about the level of the point of withdrawal of the selective solvent to the other end of said contacting zone, and wherein the raffinate phase or portion of the liquid mixture undergoing fractionation comprises the continuous phase in that section of the contacting zone extending from about the level of the point of introduction of the selective solvent to about said other end of the contacting zone where said raffinate portion or phase is withdrawn therefrom, a suitable liquid-liquid countercurrent contacting zone is indicated by reference numeral 11. There is introduced into contacting zone 11 via line 12 at about one end of said contacting zone a liquid selective solvent at a temperature $T_1$. There is introduced at an intermediate point into said contacting zone 11 via line 14 a liquid mixture to be fractionated. The selective solvent introduced into contacting zone 11 via line 12 is a selective solvent for at least one component of the liquid mixture introduced into contacting zone 11 via line 14, and is at least partially immiscible with said liquid mixture within contacting zone 11. In the embodiment illustrated in Fig. 1a of the drawing the selective solvent employed is heavier or more dense than the liquid mixture undergoing treatment and accordingly the selective solvent tends to flow downwardly countercurrent with respect to the upwardly flowing liquid mixture.

There is removed from the upper end of contacting zone 11 via line 15 a raffinate phase or raffinate portion, now having a reduced amount or substantially free of those components which are selectively dissolved in said selective solvent as compared with the liquid mixture introduced into contacting zone 11 via line 14. Further, and still in accordance with the practice of this invention, there is removed from contacting zone 11 via line 16 at a point downstream from the point of introduction of said liquid mixture in the direction of flow of said selective solvent therein a liquid stream, which liquid stream may be comprised substantially only of liquid selective solvent phase or an admixture of liquid selective phase, as the continuous phase, commingled with a raffinate phase or portion of the liquid mixture as the dispersed phase. This liquid stream withdrawn via line 16 is cooled by suitable means, such as cooler 18, and reintroduced via line 19 into contacting zone 11 at a point near the point of withdrawal of said liquid stream from contacting zone 11 but downstream therefrom in the direction of flow of said selective solvent within contacting zone 11. Advantageously an amount of extract recovered from the solvent phase which issues from the other end of contacting zone 11 via line 20 is commingled via line 17 with the liquid stream removed from contacting zone 11 via line 16 and, after cooling in cooler 18, is reintroduced therewith into contacting zone 11 via line 19.

Alongside of Fig. 1a is Fig. 1b which graphically illustrates the contacting zone temperature profile or the temperature conditions existing within contacting zone 11 when operated in accordance with the practice of our invention. As indicated in Fig. 1b, temperature $T_4$ is the temperature at the top or one end of contacting zone 11. This temperature is substantially the same as the temperature of the raffinate phase which is withdrawn from contacting zone 11 via line 15. Temperature $T_2$ is the temperature existing within contacting zone 11 at the level of the point of introduction of the liquid mixture to be fractionated, which mixture is introduced into contacting zone 11 via line 14. Temperature $T_3$ represents the temperature within contacting zone 11 at the level of the point of reintroduction of the relatively cooled liquid stream which is reintroduced into contacting zone 11 via line 19. Also graphically illustrated in Fig. 1b are temperatures $T_{4'}$ and $T_{2'}$. Contacting zone 11 may be operated in accordance with the practice of this invention so that $T_4$ is higher than temperature $T_2$ by not more than twelve degrees Fahrenheit, or contacting zone 11 may be operated so that temperature $T_{2'}$ is higher than temperature $T_{4'}$ by not more than twelve degrees Fahrenheit. In operating a liquid-liquid countercurrent contacting zone in accordance with the practice of this invention a sharp temperature gradient is maintained over the relatively small vertical interval, as indicated by points $T_{3'}$—$T_3$, within contacting zone 11. Desirably the vertical interval $T_{3'}$—$T_3$ should be as small as possible, that is, the level of the point of withdrawal of the liquid stream of contacting zone 11 via line 16 and the level of the point of reintroduction of the resulting cooled liquid stream should be as close together as possible without undue commingling or short circuiting the reintroduced, cooled liquid stream into the liquid stream withdrawn from contacting zone 11 via line 16.

Also in accordance with this invention contacting zone 11 is operated so that the temperature differential $T_2$—$T_3$ therein is in the range 2–80 degrees Fahrenheit. Still in accordance with a practice of this invention the temperature $T_1$ of the selective solvent introduced into contacting zone 11 is greater than the temperature $T_4$ at said one end of said contacting zone 11.

By varying the levels or points of introduction of the liquid mixture and/or the resulting cooled liquid stream into contacting zone 11 via lines 14 and 19, respectively, the proportions of the contacting zone 11 operating under substantially isothermal conditions or under a small temperature gradient, e. g., that portion of contacting zone 11 extending upwardly from the level of the point of introduction of the liquid mixture, or even from the point of withdrawal of the liquid stream via line 16, and that portion of contacting zone 11 operating at a relatively low temperature and including a relatively very sharp downward temperature gradient, can be readily and conveniently adjusted. Accordingly, in accordance with one embodiment of the practice of this invention the level of the point of withdrawal of the liquid stream via line 16 can be varied to be substantially immediately adjacent the level of the point of introduction of liquid mixture into contacting zone 11 via line 14. The location of the points of introduction of selective solvent via line 12, liquid mixture via line 14 and the points of withdrawal and reintroduction of the recycled liquid stream via lines 16 and 19, respectively, are varied depending upon the composition of the liquid mixture to be fractionated and the properties desired in the raffinate phase or portion of the liquid mixture. The principles which govern the locations of these points with respect to each other are known to those skilled in the art, particularly in the light of this disclosure. Further, if desired, more than one withdrawal of a liquid stream for subsequent reintroduction, after cooling, into the contacting zone may be made. For example, although not schematically illustrated in Fig. 1a, an additional side stream withdrawal of a liquid phase may be made from contacting zone 11 in the manner described hereinabove at a point downstream in the direction of flow of the selective solvent within contacting zone 11 from the point of reintroduction of the aforementioned liquid stream reintroduced into contacting zone 11 via line 19.

The practice of this invention is broadly applicable to any liquid-liquid solvent extraction process wherein two separate liquid phases are flowed countercurrently with respect to each other. Accordingly, the practice of this invention is applicable not only to those liquid-liquid countercurrent solvent extraction processes employing one selective solvent in contact with a liquid mixture to be fractionated, but is also applicable to the so-called "Duo-Sol" solvent extraction process wherein a liquid mixture to be fractionated is introduced at some intermediate point into an extraction zone wherein two immiscible solvents of different densities, e. g., liquid propane and liquid phenols, are flowed countercurrently. Selective solvents which may be used in the practice of this invention may be more dense or less dense than the liquid mixture to be separated and may comprise such well known selective solvents as nitrobenzene, liquid propane, liquid sulfur dioxide, $\beta,\beta'$-dichloroethyl ether (Chlorex), phenols (Selecto), furfural, dimethyl formamide, liquid hydrogen fluoride, ethylene glycol, polyhydrolyic alcohols, aliphatic ketones, water, acetic acid, various hydrocarbons and other various well known organic and inorganic selective solvents, provided, of course, the selective solvent employed exhibits the desired selectivity for at least one component of the mixture to be separated and is at least partially immiscible under the conditions of contacting within the contacting zone with the liquid mixture to be fractionated.

As already indicated, the operating conditions within the contacting zone may be adjusted in accordance with the composition and chemical and physical properties of the liquid mixture undergoing fractionation and the properties desired in the raffinate phase and/or in the solvent extract phase. Any suitable pressure, atmospheric, superatmospheric or subatmospheric may be employed depending upon the boiling points and/or molecular weight of the components making up the liquid mixture and the selective solvent employed. The pressure employed, however, should be sufficiently high to maintain all the components introduced into the contacting zone in the liquid phase. Similarly, any suitable temperatures may be employed, the temperatures and pressure being adjusted to maintain countercurrently flowing liquid phases within the contacting zone. For example, as applied to the refining of a petroleum fraction for removal of aromatic or more aromatic components from non-aromatic or less aromatic components an upper or raffinate $T_4$ temperature in the range 125–325° F. is suitably employed together with a bottom or solvent extract phase temperature in the range 100–225° F. Various selective solvent to liquid mixture dosages may be employed depending upon the composition of the liquid mixture to be fractionated and the particular selective solvent employed; for example, a volume ratio selective solvent to liquid mixture in the range 0.75:7.5, more or less, may be employed. Generally, various temperatures and solvent dosages may be employed depending upon the selective solvent or solvents and/or the composition of the liquid mixture undergoing fractionation.

Liquide mixtures which may be fractionated by employing the practice of this invention include such liquid hydrocarbon fractions or mixtures as gasolines, naphthas, kerosenes, gas-oils, lubricating oils, light or heavy lubricating oil fractions, catalytically cracked gas oils, crude oils and the like. Other liquid mixtures which may be fractionated are liquid mixtures containing unsaturated or more unsaturated compounds, such as olefinic and acetylinic hydrocarbons, and paraffinic or relatively less unsaturated compounds such as the paraffinic hydrocarbons and the mono-unsaturated or mono-olefinic hydrocarbons. Other mixtures which may be fractionated in accordance with the practice of this invention include such mixtures of organic compounds as tall oil, fatty acid mixtures, mixtures of fatty acid glycerides, natural or synthetic drying oils, Fischer-Tropsch product fractions containing hydrocarbons and oxygenated hydrocarbons. In general, any liquid mixture containing a component which is selectively extracted or dissolved in a selective solvent therefor and which is admixed with a material for which the selective solvent evidences less selectivity and which is coboiling with or has substantially the same boiling point as the selectively extracted material, may be suitably treated in accordance with the practice of this invention.

Any contacting zone suitable for effecting contact between countercurrently flowing immiscible liquids may be employed in the practice of this invention. Exemplary of suitable contacting zones are packed towers, bubble tray towers, a combination of mixers, settlers and the like. The practice of this invention is particularly suitable in a rotating disc contactor as fully set forth and described in U. S. Patent 2,601,674, patented June 24, 1952, in the name of Gerrit H. Reman; the teachings and disclosures of this patent are herein incorporated and made a part of this disclosure. Briefly, the rotating disc contactor, a device particularly suitable for effecting contact between countercurrently flowing liquid streams, comprises a stationary tubular shell of which the part forming the actual contacting zone is subdivided into a plurality of compartments, preferably substantially identical in size and shape, by stationary angular baffles or rings having central openings. Further, there are rotor discs, one in each compartment, fixed on a rotor shaft coaxial with the stationary tube, the discs being located approximately halfway between the stationary baffles. The liquids to be contacted are fed into the contactor to traverse the several compartments successively in countercurrent flow to one another; since the liquids are of different densities this results in the formation of two liquid phases which traverse the successive compartments in opposite directions. The rotation of the rotor discs imparts a further, even more important, movement to the liquids, causing intimate contacting. The important features of the rotating disc contactor therefore resides in the arrangement of the disc and stators. The diameter of the rotor discs is smaller than the diameter of the openings in the stator baffles. Further features reside in the relationship of the diameter of the stationary tube and the diameter of the rotor discs and the axial interval between the baffles, and also in the shapes of the stator baffles and discs. The operation and the applicability of a rotating disc contactor in a liquid-liquid countercurrent solvent extraction operation is more fully described in the above-identified patent.

The following examples are illustrative of the practice of this invention.

*Example No. 1*

Four hundred and four barrels of an Arabian Bright Stock at a temperature of 248° F. were introduced into an intermediate section of a liquid-liquid contacting tower. One thousand six hundred and sixty four barrels of furfural at a temperature of 270° F. were introduced near the top of the tower. A side stream was taken from the contacting tower at a point below the point of introduction of the charge oil. To this side stream were added 202 barrels per day of extract recycle and the resulting admixture amounting to 1113 barrels per day was cooled to a temperature of 113° F. and introduced into the contacting tower at a point just below the point of withdrawal of the side stream. The top of the tower at the point of raffinate withdrawal was operated at a temperature of 260° F. The temperature of the tower at the level of the charge oil entry was 254° F. and the temperature of the tower at the level of the side stream withdrawal was 225° F. and at the level of re-entry of the cooled side stream was about 215° F. The bottom of the tower at the point of furfural solvent phase withdrawal was 210° F. The charge oil and the resulting extract and raffinate had the following properties.

| Tests | Charge | Extract. | Raff. |
|---|---|---|---|
| Grav., ° A. P. I. | 20.1 | 10.4 | 25.5 |
| Flash, COC/PM | 550/465 | 525/485 | 570/540 |
| Vis., S. S. U./100 | 3471 | | 1807 |
| Vis., S. S. U./210 | 170.3 | 133.8 | 143.5 |
| V. I. | 87.0 | | 110.5 |
| Color (Union) | 5 | | 2½ |
| Corrected charge and product rates in barrels per day | 389 | 133 | 251 |

*Example No. 2*

An Arabian light neutral distillate at the rate of 800 barrels per day at a temperature of 167° F. was introduced into the middle section of a liquid-liquid contacting tower. Six hundred and forty two barrels per day of furfural at a temperature of 172° F. were introduced into the upper part of the tower. A first side stream was withdrawn from the tower at a point below the point of entry of the light neutral distillate oil, cooled to 118° F. and reintroduced immediately below the point of side stream withdrawal. There was withdrawn from the top of the tower a raffinate stream at temperature of 162° F. and there was withdrawn from the bottom of the tower a furfural solvent stream at a temperature of 100° F. Further, a second side stream was withdrawn from the tower at a point below the point of first side stream withdrawal. To the second side stream there was added 161 barrels per day of extract recycle. The resulting admixture was cooled to 86° F. and reintroduced into the tower immediately below the level of the point of withdrawal of the second side stream at the rate of 1412 barrels per day. The following temperatures were maintained within the contacting tower: top of tower 162° F.; tower temperature at level of charge oil inlet 154° F.; tower temperature at level of first side stream withdrawal 145° F.; tower temperature at level of the point of reintroduction of first cooled side stream 142° F.; tower temperature at level of second side stream withdrawal 138° F.; tower temperature at level of second side stream reintroduction 133° F. The following table sets forth the characteristics of the charge oil and the recovered extract and raffinate phases.

| Tests | Charge | Extract. | Raff. |
|---|---|---|---|
| Grav., °A. P. I. | 22.8 | 1.2 | 27.8 |
| Flash, COC/PM | 410/390 | 420 | 400/405 |
| Vis., S. S. U./100 | | | 158 |
| Vis., S. S. U./210 | | [1] 7.16 | 43.9 |
| V. I. | | | 104.5 |
| Color (Union) | 5 | | 3 |
| Corrected charge and product rates in barrels per day | 771 | 132 | 639 |

[1] Viscosity of extract in Furol seconds at 210° F.

Example No. 3

Four hundred and four barrels per day of an Arabian Bright Stock at a temperature of 250° F. were introduced into an intermediate section of a liquid-liquid contacting zone. One thousand six hundred and sixty four barrels per day of furfural at a temperature of 270° F. were introduced into the top of the tower. A side stream was withdrawn from the tower at a point below the point of entry of the charge oil and after admixture with 202 barrels per day extract recycle and after having been cooled to 109° F. was reintroduced into the tower at a point immediately below the point of side stream withdrawal. The amount of side stream thus reintroduced into the tower was 1086 barrels per day. Raffinate at a temperature 258° F. was withdrawn from the top of the tower and the furfural solvent phase at a temperature 212° F. was withdrawn from the bottom of the tower. The following temperature conditions prevailed within the contacting tower. The temperature of the tower at the level of the point of introduction of charge oil was 254° F. The temperature of the tower at the level of side stream withdrawal was 226° F. The temperature of the tower at the level of the point of reintroduction of the cooled side stream was 220° F. The following table gives the characteristics of the charge stock and the recovered extract and raffinate phases.

| Tests | Charge | Extract. | Raff. |
|---|---|---|---|
| Grav., °A. P. I. | 19.8 | 10.5 | 25.3 |
| Flash, COC/PM | 560/470 | 530/515 | 570/535 |
| Vis., S. S. U./100 | 3471.6 | | 1854 |
| Vis., S. S. U./210 | 170.8 | [1] 36.4 | 142.3 |
| V. I. | 87.0 | | 109.0 |
| Color (Union) | <6 | | <3 |
| Corrected charge and product rates in barrels per day | 391 | 135 | 256 |

[1] Viscosity of extract in Furol seconds at 210° F.

Example No. 4

Six hundred and two barrels per day of an Arabian heavy neutral distillate at a temperature of 201° F. were introduced into the intermediate section of a liquid-liquid contacting tower. One thousand four hundred and eighty two barrels per day of furfural at a temperature of 236° F. were introduced into the top of the tower. A first side stream was withdrawn from the tower at a point below the point of charge oil entry, cooled to a temperature of 113° F. and reintroduced into the tower substantially immediately below the point of withdrawal at a rate of 1083 barrels per day. A second side stream was also withdrawn from the tower at a point below the point of reentry of the first cooled side stream. To the second side stream were added 184 barrels per day of extract recycle. This second side stream admixed with the added extract recycle (184 barrels per day), was cooled to 95° F. and reintroduced into the tower at a rate of 1657 barrels per day substantially immediately below the point of withdrawal of the second side stream. There was withdrawn from the top of the tower a raffinate phase at a temperature 230° F. and there was recovered from the bottom of the tower a furfural solvent extract phase at a temperature of 140° F. The following temperatures were maintained within the tower. The tower temperature at the level of the point of entry of the charge oil was 230° F. The tower temperature at the point of withdrawal of the first side stream was 190° F. The tower temperature at the level of the point of reentry of the first cooled side stream was 181° F. The tower temperature at the level of the point of withdrawal of the second side stream was 167° F. and at the level of the point of reintroduction of the second side stream was 165° F. The following table lists the characteristics of the charge oil and the recovered extract and raffinate phases.

| Tests | Charge | Extract. | Raff. |
|---|---|---|---|
| Grav., °A. P. I. | 20.0 | 55 | 28.4 |
| Flash, COC/PM | 455/445 | 455 | 455/445 |
| Vis., S. S. U./100 | 667 | | 347 |
| Vis., S. S. U./210 | 66.8 | 159.0 | 57.0 |
| V. I. | 76.0 | | 109.5 |
| Color (Union) | | | 4 |
| Corrected charge and product rates in barrels per day | 573 | 191 | 382 |

Example No. 5

Six hundred and two barrels per day of an Arabian heavy neutral distillate at a temperature of 180° F. were introduced into the intermediate section of a liquid-liquid contacting tower. Five hundred and ninety seven barrels per day of furfural at a temperature of 198° F. were introduced into the top of the tower. At a point below the point of entry of the charge oil a first side stream at a rate of 941 barrels per day was withdrawn and after having been cooled to 133° F. was reintroduced into the tower at a point substantially immediately below the point of withdrawal. A second side stream was withdrawn from the tower at a point below the point of withdrawal of the first side stream. To the second side stream there were added 122 barrels per day of extract recycle. The resulting admixture was cooled to 113° F. and reintroduced into the tower at a point immediately below the point of withdrawal of the second side stream at a rate of 896 barrels per day. There was withdrawn a raffinate phase from the top of the tower at a temperature of 190° F. and there was recovered from the bottom of the tower a furfural solvent extract phase at a temperature of 120° F. The following temperatures were maintained within the liquid-liquid contacting tower. At the level of the point of the charge oil the tower temperature was maintained at 180° F. At the level of the point of withdrawal of the first side stream the tower temperature was 167° F. At the level of the point of reentry of the first side stream the tower temperature was 138° F. At the level of the point of withdrawal of the second side stream the tower temperature was 131° F. At the level of the point of reentry of the cooled second side stream the tower temperature was 122° F. The following table lists the characteristics of the charge oil and the recovered extraction and raffinate phases.

| Tests | Charge | Extract. | Raff. |
|---|---|---|---|
| Grav., °A. P. I. | 20.5 | −0.5 | 25.4 |
| Flash, P. M. | 380 | 410 | 370 |
| Vis., S. S. U./100 | 598 | | 412 |
| Vis., S. S. U./210 | 63.6 | 225.2 | 58.1 |
| V. I. | 75.0 | | 91.0 |
| Color (Union) | 8 | | 5 |
| Corrected charge and product rates in barrels per day | 632 | 105 | 527 |

Example No. 6

An Arabian deasphalted residue at a rate of 387 barrels per day and at a temperature of 236° F. was introduced at an intermediate section into a liquid-liquid contacting tower. There was introduced into the top of the tower 1459 barrels per day of furfural at a temperature of 274° F. A side stream was withdrawn from the tower at a point below the point of entry of the charge oil. To the side stream were added 192 barrels per day of extract recycle and the resulting admixture, after having been cooled to a temperature of 104° F., was reintroduced into the tower at a rate of 921 barrels per day immediately below the point of withdrawal of the side stream. There was recovered from the top of the tower a raffinate stream at a temperature of 255° F. and there was withdrawn from the bottom of the tower a furfural solvent extract phase at a temperature of 210° F. The following temperatures were maintained within the contacting tower. At the level of the point of entry of the charge oil the temperature was maintained at 258° F. At the level of the point of withdrawal of the side stream the temperature was maintained at 245° F. At the level of the point of reentry of the resulting cooled side stream the tower was maintained at a temperature of about 220° F. The characteristics of the charge oil and the recovered raffinate and extract phases are set forth in the following table.

| Tests | Charge | Extract. | Raff. |
|---|---|---|---|
| Grav., °A. P. I. | 20.6 | 10.4 | 25.4 |
| Flash, P. M. | | 475 | 555 |
| Vis., S. S. U./100 | | | 1,900 |
| Vis., S. S. U./210 | | ¹ 40.6 | 138.3 |
| V. I. | | | 105.0 |
| Color (Union) | 5 | | 3 |
| Corrected charge and product rates in barrels per day | 392 | 137 | 255 |

¹ Viscosity of extract in Furol seconds at 210° F.

As will be evident to those skilled in the art in the light of the foregoing disclosure many modifications, changes and substitutions may be made without departing from the spirit or scope thereof.

We claim:

1. A method of liquid-liquid countercurrent solvent refining a liquid mixture into fractions of diffrent characteristics which comprises introducing a liquid selective solvent into a liquid-liquid contacting zone at about one end thereof, said selective solvent being a selective solvent for at least one component of said liquid mixture and at least partially immiscible with said liquid mixture, introducing said liquid mixture at an intermediate point into said contacting zone, withdrawing a liquid stream from said contacting zone at a point downstream from the point of introduction of said liquid mixture in the direction of flow of said liquid selective solvent within said contacting zone, cooling said withdrawn liquid stream, introducing the resulting cooled liquid stream into said contacting zone near the point of withdrawal of said liquid stream but removed therefrom in the direction of flow of said liquid selective solvent within said contacting zone, withdrawing from the other end of said contacting zone liquid selective solvent phase and withdrawing from said one end of said contacting zone a raffinate portion of said liquid mixture, the proportions and temperatures of said liquid mixture, said liquid selective solvent and said resulting cooled stream introduced into said contacting zone being adjusted so that the following temperature relationships exist within said contacting zone: the temperature differential $T_4-T_2$ being in the range 0 to ±12 and the temperature differential $T_2-T_3$ being in the range 2–80, all temperatures being degrees Fahrenheit, and wherein $T_2$ is the temperature within said contacting zone at the level of the point of introduction of said liquid mixture, $T_3$ is the temperature within said contacting zone at the level of the point of introduction of said resulting cooled stream and $T_4$ is the temperature within said contacting zone at said one end thereof where said raffinate portion is withdrawn.

2. A method of liquid-liquid countercurrent solvent refining a liquid mixture into fractions of different characteristics which comprises introducing a liquid selective solvent into a liquid-liquid contacting zone at about one end thereof, said selective solvent being a selective solvent for at least one componet of said liquid mixture and at least partially immiscible with said liquid mixture, introducing said liquid mixture at an intermediate point into said contacting zone, withdrawing a liquid stream from said contacting zone at a point downstream from the point of introduction of said liquid mixture in the direction of flow of said liquid selective solvent within said contacting zone, cooling said withdrawn liquid stream, introducing the resulting cooled liquid stream into said contacting zone near the point of withdrawal of said liquid stream but removed therefrom in the direction of flow of said liquid selective solvent within said contacting zone, withdrawing from the other end of said contacting zone liquid selective solvent phase and withdrawing from said one end of said contacting zone a raffinate portion of said liquid mixture, the proportions and temperatures of said liquid mixture, said liquid selective solvent and said resulting cooled stream introduced into said contacting zone being adjusted so that the following temperature relationships exist within said contacting zone: the temperature differential $T_4-T_2$ being substantially 0 and the temperature differential $T_2-T_3$ being in the range 2–80, all temperatures being degrees Fahrenheit, and wherein $T_2$ is the temperature within said contacting zone at the level of the point of introduction of said liquid mixture, $T_3$ is the temperature within said contacting zone at the level of the point of introduction of said resulting cooled stream and $T_4$ is the temperature within said contacting zone at said one end thereof where said raffinate portion is withdrawn.

3. A method of liquid-liquid countercurrent solvent refining a liquid mixture into fractions of different characteristics which comprises introducing a liquid selective solvent into a liquid-liquid contacting zone at about one end thereof, said selective solvent being a selective solvent for at least one component of said liquid mixture and at least partially immiscible with said liquid mixture, introducing said liquid mixture at an intermediate point into said contacting zone, withdrawing a liquid stream from said contacting zone at a point downstream from the point of introduction of said liquid mixture in the direction of flow of said liquid selective solvent within said contacting zone, cooling said withdrawn liquid stream, introducing the resulting cooled liquid stream into said contacting zone near the point of withdrawal of said liquid stream but removed therefrom in the direction of flow of said liquid selective solvent within said contacting zone, withdrawing from the other end of said contacting zone liquid selective solvent phase and withdrawing from said one end of said contacting zone a raffinate portion of said liquid mixture, the proportions and temperatures of said liquid mixture, said liquid selective solvent and said resulting cooled stream introduced into said contacting zone being adjusted so that the following temperature relationships exist within said contacting zone: $T_1$ being greater than $T_4$; the temperature differential $T_4-T_2$ being in the range 0 to +12 and the temperature differential $T_2-T_3$ being in the range 2–80, all temperatures being degrees Fahrenheit, and wherein $T_1$ is the temperature of the selective solvent introduced into said contacting zone, $T_2$ is the temperature within said contacting zone at the level of the point of introduction of said liquid mixture, $T_3$ is the temperature within said contacting zone at the level of the point of introduction of said resulting cooled stream and $T_4$ is the temperature within said contacting zone at said one end thereof where said raffinate portion is withdrawn.

4. A method of liquid-liquid countercurrent solvent refining a liquid mixture into fractions of different characteristics which comprises introducing a liquid selective solvent into a liquid-liquid contacting zone at about one end thereof, said selective solvent being a selective solvent for at least one component of said liquid mixture and at least partially immiscible with said liquid mixture, introducing said liquid mixture at an intermediate point into said contacting zone, the amounts of said liquid mixture and said selective solvent introduced into said contacting zone being such that said liquid selective solvent comprises the continuous phase within said contacting zone extending from about the point of introduction of said liquid solvent to the other end of said contacting zone and the raffinate portion of said liquid mixture comprises the continuous phase within said contacting zone extending from about the point of introduction of said liquid selective solvent to said one end of said contacting zone, withdrawing liquid selective solvent phase from said contacting zone at a point near the point of introduction of said liquid mixture but removed therefrom in the direction of flow of said liquid selective solvent within said contacting zone, cooling said withdrawn liquid selective solvent phase, introducing the resulting cooled liquid selective solvent phase into said contacting zone near the point of withdrawal of said liquid selective solvent phase but removed therefrom in the direction of flow of said liquid selective solvent within said contacting zone, withdrawing from said other end of said contacting zone liquid selective solvent phase and withdrawing from said one end of said contacting zone said reffinate portion of said liquid mixture, the proportions and temperatures of said liquid mixture, said liquid selective solvent and said resulting cooled liquid selective solvent phase introduced into said contacting zone being adjusted so that the following temperature relationships exist within said contacting zone: the temperature differential $T_4-T_2$ being in the range 0 to $\pm 12$ and the temperature differential $T_2-T_3$ being in the range 2–80, all temperatures being degrees Fahrenheit, and wherein $T_2$ is the temperature within said contacting zone at the level of the point of introduction of said liquid mixture, $T_3$ is the temperature within said contacting zone at the level of the point of introduction of said resulting cooled selective solvent phase and $T_4$ is the temperature within said contacting zone at said one end thereof where said raffinate portion is withdrawn.

5. A method of liquid-liquid countercurrent solvent refining a liquid mixture into fractions of different charterteristics which comprises introducing a liquid selective solvent into a liquid-liquid contacting zone at about one end thereof, said selective solvent being a selective solvent for at least one component of said liquid mixture and at least partially immiscible with said liquid mixture, introducing said liquid mixture at an intermediate point within said contacting zone, withdrawing a liquid stream from said contacting zone downstream from the point of introduction of said liquid mixture in the direction of flow of said liquid selective solvent within said contacting zone, cooling said withdrawn liquid stream, introducing the resulting cooled liquid stream into said contacting zone at a point substantially immediately adjacent the point of withdrawal of said liquid stream but removed therefrom in the direction of flow of said liquid selective solvent within said contacting zone, withdrawing from the other end of said contacting zone a liquid selective solvent phase and withdrawing from said one end of said contacting zone a raffinate portion of said liquid mixture, the proportions and temperatures of said liquid mixture, said liquid selective solvent and said resulting cooled stream introduced into said contacting zone being adjusted so that the following temperature relationships exist within said contacting zone: $T_1$ being greater than $T_4$; the temperature differential $T_4-T_2$ being in the range 0 to $\pm 12$ and the temperature differential $T_2-T_3$ being in the range 2–80, all temperatures being degrees Fahrenheit, and wherein $T_1$ is the temperature of the selective solvent introduced into said contacting zone, $T_2$ is the temperature within said contacting zone at the level of the point of introduction of said liquid mixture, $T_3$ is the temperature within said contacting zone at the level of the point of introduction of said resulting cooled stream and $T_4$ is the temperature within said contacting zone at said one end thereof where said raffinate portion is withdrawn.

6. A method of liquid-liquid countercurrent solvent refining a liquid hydrocarbon mixture into fractions of different characteristics which comprises introducing a liquid selective solvent into a liquid-liquid contacting zone at about one end thereof, said selective solvent being a selective solvent for at least one component of said liquid hydrocarbon mixture and at least partially immiscible with said liquid hydrocarbon mixture, introducing said liquid hydrocarbon mixture at an intermediate point into said contacting zone, withdrawing a liquid stream from said contacting zone at a point downstream from the point of introduction of said liquid hydrocarbon mixture in the direction of flow of said liquid selective solvent within said contacting zone, cooling said withdrawn liquid stream, introducing the resulting cooled liquid stream into said contacting zone near the point of withdrawal of said liquid stream but removed therefrom in the direction of flow of said liquid selective solvent within said contacting zone, withdrawing from the other end of said contacting zone liquid selective solvent phase and withdrawing from said one end of said contacting zone a raffinate portion of said liquid hydrocarbon mixture, the proportions and temperatures of said liquid hydrocarbon mixture, said liquid selective solvent and said resulting cooled stream introduced into said contacting zone being adjusted so that the following temperature relationships exist within said contacting zones: $T_4-T_2$ being in the range 0 to $\pm 12$ and the temperature differential $T_2-T_3$ being in the range 2–80, all temperatures being degrees Fahrenheit, and wherein $T_2$ is the temperature within said contacting zone at the level of the point of introduction of said liquid hydrocarbon mixture, $T_3$ is the temperature within said contacting zone at the point of introduction of said resulting cooled stream and $T_4$ is the temperature within said contacting zone at said one end thereof where said raffinate portion is withdrawn.

7. A method in accordance with claim 6 wherein said selective solvent is furfural.

8. A method in accordance with claim 6 wherein said selective solvent is sulfur dioxide.

9. A method in accordance with claim 6 wherein said selective solvent is $\beta, \beta'$ dichlorodiethyl ether.

10. A method in accordance with claim 6 wherein said selective solvent is nitrobenzene.

11. A method in accordance with claim 6 wherein said selective solvent is a phenol.

12. A method in accordance with claim 6 wherein said temperature differential $T_4-T_2$ is in the range of 0 to $-12$.

13. A method in accordance with claim 12 wherein said selective solvent is furfural.

14. A method of liquid-liquid countercurrent solvent refining a liquid hydrocarbon mixture into fractions of different characteristics which comprises introducing a liquid selective solvent into a liquid-liquid contacting zone at about one end thereof, said selective solvent being a selective solvent for at least one component of said liquid hydrocarbon mixture and at least partially immiscible with said liquid hydrocarbon mixture, introducing said liquid hydrocarbon mixture at an intermediate point into said contacting zone, withdrawing a liquid stream from said contacting zone at a point downstream from the point of introduction of said liquid hydrocarbon mixture in the direction of flow of said liquid selective solvent within said contacting zone, cooling said withdrawn liquid stream, introducing the resulting cooled liquid stream into said contacting zone near the point of withdrawal of said liquid stream but removed therefrom in the direction of flow of said liquid selective solvent within said contacting zone, withdrawing from the other end of said contacting zone liquid selective solvent phase and withdrawing from said one end of said contacting zone a raffinate portion of said liquid hydrocarbon mixture, the proportions and temperatures of said liquid hydrocarbon mixture, said liquid selective solvent and said resulting cooled stream introduced into said contacting zone being adjusted so that the following temperature relationships exist within said contacting zone: $T_1$ being greater than $T_4$, the temperature differential $T_4$—$T_2$ being in the range 0 to ±12 and the temperature differential $T_2$—$T_3$ being in the range 2–80, all temperatures being degrees Fahrenheit, and wherein $T_1$ is the temperature of the selective solvent introduced into said contacting zone, $T_2$ is the temperature within said contacting zone at the level of the point of introduction of said liquid hydrocarbon mixture, $T_3$ is the temperature within said contacting zone at the point of introduction of said resulting cooled stream and $T_4$ is the temperature within said contacting zone at said one end thereof where said raffinate portion is withdrawn.

15. A method in accordance with claim 14 wherein said selective solvent is furfural.

16. A method in accordance with claim 14 wherein a hydrocarbon extract is recovered from the liquid selective phase withdrawn from said other end of said contacting zone and introduced into said contacting zone in admixture with said resulting cooled liquid stream.

17. A method in accordance with claim 14 wherein said selective solvent is furfural, wherein said liquid selective solvent phase withdrawn from said other end of said contacting zone has a temperature in the range 100–225° F. and wherein said raffinate portion of said liquid hydrocarbon mixture withdrawn from said one end of said contacting zone has a temperature in the range 125–325° F.

18. A method in accordance with claim 14 wherein said selective solvent is furfural and wherein the volume ratio of furfural selective solvent to said liquid hydrocarbon mixture is in the range 0.75–7.5.

19. A method in accordance with claim 14 wherein said contacting zone is a rotating disc contactor comprising a vertically extending stationary tubular shell divided into a plurality of compartments by stationary baffles therein, said baffles being provided with central openings therethrough, each of said compartments being provided with a rotor disc fixed to a rotor shaft coaxially fixed within said tubular shell, said disc being fixed to said rotor shaft approximately half way between said stationary baffles.

References Cited in the file of this patent

UNITED STATES PATENTS

| 2,149,574 | Brown | Mar. 7, 1939 |
| 2,346,491 | Kiersted | Apr. 11, 1944 |
| 2,390,429 | Dons et al. | Dec. 4, 1945 |
| 2,766,300 | Weeman | Oct. 9, 1956 |